US008651738B2

(12) United States Patent
Schlipf

(10) Patent No.: US 8,651,738 B2
(45) Date of Patent: Feb. 18, 2014

(54) HIGH-TEMPERATURE PLUG

(75) Inventor: Andreas Schlipf, Tuttlingen (DE)

(73) Assignee: Türk & Hillinger GmbH, Tuttlingen (DE)

( * ) Notice: Subject to any disclaimer, the term of this patent is extended or adjusted under 35 U.S.C. 154(b) by 520 days.

(21) Appl. No.: 12/873,514

(22) Filed: Sep. 1, 2010

(65) Prior Publication Data

US 2011/0051777 A1 Mar. 3, 2011

(30) Foreign Application Priority Data

Sep. 2, 2009 (DE) ..................... 20 2009 011 860 U

(51) Int. Cl.
*G01K 1/04* (2006.01)
*G01K 1/14* (2006.01)
*G01K 1/16* (2006.01)

(52) U.S. Cl.
USPC ........... 374/208; 374/163; 374/179; 374/141; 374/100

(58) Field of Classification Search
USPC ......... 374/163, 208, 141, 179, 185, 100, 139; 136/200, 224, 230, 235; 73/866.5; 116/216
See application file for complete search history.

(56) References Cited

U.S. PATENT DOCUMENTS 2,084,992 A * 6/1937 Claypoole ..................... 136/230
2,810,005 A * 10/1957 Ray .............................. 136/218
2,849,518 A * 8/1958 MacDonald .................. 136/235
2,997,687 A * 8/1961 Walter ......................... 439/687
3,048,642 A * 8/1962 Parker, Jr. ..................... 136/234
3,232,794 A * 2/1966 Korton .......................... 136/233
3,319,215 A * 5/1967 Moore .......................... 439/437
3,363,462 A * 1/1968 Sabin ......................... 73/204.15
3,589,192 A * 6/1971 Sabovik ........................ 136/230
3,774,297 A * 11/1973 Wagner ......................... 136/226
3,792,418 A 2/1974 Kailus
4,087,693 A * 5/1978 Brown et al. ............ 250/390.01
4,305,639 A * 12/1981 Kolb ............................. 439/668
4,454,370 A * 6/1984 Voznick ........................ 136/221
4,863,283 A * 9/1989 Falk .............................. 374/181
5,046,857 A * 9/1991 Metzger et al. ............... 374/135
5,088,835 A * 2/1992 Shigezawa et al. ........... 374/181
5,161,893 A * 11/1992 Shigezawa et al. ........... 374/181

(Continued)

FOREIGN PATENT DOCUMENTS

DE 22 42 677 A 3/1973
DE 32 29 899 A1 2/1984

(Continued)

*Primary Examiner* — Gail Verbitsky
(74) *Attorney, Agent, or Firm* — McGlew and Tuttle, P.C.

(57) ABSTRACT

A high-temperature plug (10) is provided for a heating element and/or thermocouple or a temperature sensor with at least one wire section (18) embedded in an insulating manner within a metal jacket (16) with a wire end (14) led out from the metal jacket (16) on the front side. The high-temperature plug (10) has a connection sleeve (11) made of metal, into which the at least one wire section (18) embedded in an insulating manner within the metal jacket (16) opens. At least one contact element (12) is in electrical contact within the connection sleeve (11) with the wire end (14) led out from the metal jacket (16) on the front side. At least the end section, facing the at least one wire end (14), of the at least one contact element (12) is embedded in an insulating compound (13) or a metal oxide, such that the embedding fixes the contact element (12) in the connection sleeve.

17 Claims, 2 Drawing Sheets

(56) References Cited

U.S. PATENT DOCUMENTS

| | | | | | |
|---|---|---|---|---|---|
| 5,197,805 | A * | 3/1993 | Wilson | 374/208 |
| 5,309,133 | A * | 5/1994 | Berger et al. | 338/22 R |
| 5,441,072 | A * | 8/1995 | Indey et al. | 137/101.21 |
| 5,577,841 | A * | 11/1996 | Wall | 374/140 |
| 5,720,553 | A * | 2/1998 | Falk | 374/26 |
| 6,068,400 | A * | 5/2000 | Nelson et al. | 374/179 |
| 6,183,304 | B1 * | 2/2001 | Hollander et al. | 439/620.05 |
| 6,293,700 | B1 * | 9/2001 | Lund et al. | 374/181 |
| 6,698,922 | B2 * | 3/2004 | Adachi et al. | 374/208 |
| 7,439,845 | B2 * | 10/2008 | Houben et al. | 338/28 |
| 7,740,403 | B2 * | 6/2010 | Irrgang et al. | 374/185 |
| 7,748,898 | B2 * | 7/2010 | Toudou et al. | 374/208 |
| 7,780,348 | B2 * | 8/2010 | Houben et al. | 374/185 |
| 7,855,632 | B1 * | 12/2010 | Schuh et al. | 338/28 |
| 7,891,870 | B2 * | 2/2011 | Hotta et al. | 374/179 |
| 7,994,416 | B2 * | 8/2011 | Schuh | 136/230 |
| 8,057,095 | B2 * | 11/2011 | Wendler | 374/208 |
| 8,092,086 | B2 * | 1/2012 | Suzuki et al. | 374/208 |
| 8,177,427 | B2 * | 5/2012 | Yokoi et al. | 374/208 |
| 8,256,956 | B2 * | 9/2012 | Suzuki et al. | 374/185 |
| 2002/0172259 | A1 * | 11/2002 | Bach | 374/208 |
| 2004/0255666 | A1 * | 12/2004 | Park | 73/204.24 |
| 2006/0215731 | A1 * | 9/2006 | Gadonniex et al. | 374/208 |
| 2007/0171959 | A1 * | 7/2007 | Irrgang et al. | 374/185 |
| 2008/0080592 | A1 * | 4/2008 | Houben et al. | 374/185 |
| 2009/0200286 | A1 * | 8/2009 | Reissner | 219/264 |

FOREIGN PATENT DOCUMENTS

| | | | |
|---|---|---|---|
| DE | 3729076 | A1 * | 3/1989 |
| DE | 44 41 777 | A | 5/1996 |
| JP | 58048825 | A * | 3/1983 |

* cited by examiner

HIGH-TEMPERATURE PLUG

CROSS REFERENCE TO RELATED APPLICATIONS

This application claims the benefit of priority under 35 U.S.C. §119 of German Patent Application DE 20 2009 011 860.6 filed Sep. 2, 2009, the entire contents of which are incorporated herein by reference.

FIELD OF THE INVENTION

The present invention pertains to a high-temperature plug as it is used especially on heating elements and/or thermocouples or temperature sensors, and a heating element and/or thermocouple as well as a temperature sensor with such a high-temperature plug.

BACKGROUND OF THE INVENTION

Only a few of the plurality of prior-art patch plugs are suitable for high-temperature applications, in which the plugs are exposed to a thermal load of 120° C. and higher. Especially problematic is the use of plastic inserts that are often used at lower temperatures to electrically insulate the outer surface of the plug and the individual poles against one another and to fix them to one another in a preset position.

High-temperature plugs in which a connection is established for every individual pole between a contact element and a conductor and the corresponding connection is then surrounded, especially after the plug thus produced has been combined with a counterplug, with a housing made of PEEK or heat-shrinkable sleeve, which said housing is coordinated with the conductor cross section and the external diameter of the individual conductor and is crimped with same and is thus thermally and electrically insulated, are known. High-temperature plugs of this type are available, e.g., from Electrolux under the name "high-temperature plug-in connection HTC."

The drawback of this embodiment is that the manufacture of a plug-in connection is associated with a relatively great effort. Furthermore, the space requirement is relatively high, especially for multipole high-temperature plug-in connections, which are based on these plugs.

There is also a need for a high-temperature plug in the cleaning of plastic spray nozzles extrusion coated or sprayed over with plastic, on which a heating element is mounted, by furnace application at temperatures of, for example, higher than 300° C.

SUMMARY OF THE INVENTION

The object of the present invention is therefore to make available a high-temperature plug that is compact and can be manufactured in a favorable manner, as well as heating elements and/or thermocouples, as well as temperature sensors with such a high-temperature plug.

This object is accomplished by a high-temperature plug, by a heating element, by a thermocouple and by a temperature sensor having the features having the features according to the invention.

The high-temperature plug according to the present invention for a heating element and/or thermocouple or a temperature sensor with at least one wire section embedded in an insulating manner within a metal jacket with a wire end led out from the metal jacket on the front side, has a connection sleeve made of metal, into which the at least one wire section embedded in an insulating manner within a metal jacket opens. At least one contact element is in electrical contact within the connection sleeve with the wire end led out from the metal jacket on the front side.

According to the present invention, at least the end section, facing the at least one wire end, of the at least one contact element is embedded in an insulation compound or a metal oxide, such that the embedding fixes the contact element in the connection sleeve.

In terms of this invention, an insulation compound is defined especially as a ceramic insulation compound, an epoxy resin, a silicone rubber, at least one ceramic molding or one ceramic cement compound.

In this case, fixed means that the position of the contact elements in relation to one another and in the connection sleeve is fixed.

The present invention is based on the discovery that an insulation compound or a metal oxide may not only offer a good thermal insulation, but also take over electrical insulation of the individual poles and of the housing formed by the connection sleeve at least in sections as well as the fixing of the poles and of the housing in relation to one another. This multifunctional use of an insulation compound or metal oxide would make possible a simple design that can be manufactured in a fast manner, which is, moreover, overall compact as well.

The design is especially simple when at least the end section, facing the at least one wire end, of the at least one contact element is embedded in an insulation compound or a metal oxide, such that the embedding fixes the contact directly in the connection sleeve. A direct fixing is present when the preset position is guaranteed alone by the interaction between the connection sleeve, insulation compound and the embedded section of the contact element. By contrast, if the contact elements are embedded in a plastic sleeve to fix the position of the contact elements in relation to each other and then the position of the plastic sleeve is fixed within the connection sleeve, the fixing is no longer direct, but only indirect.

It proved to be especially advantageous in particular for the desired fixing of the contact elements when the insulation compound or the metal oxide fills up the space between the contact element and/or the wire end and connection sleeve in any direction running at right angles to the plugging direction. In other words, at least in the contact area the entire cross section of the connection sleeve is filled up with ceramic insulation compound or a metal oxide in this embodiment.

An especially simple design of the high-temperature plug is achieved when the entire volume of the connection sleeve is filled up with ceramic insulation compound or metal oxide in the plugging direction in the area between the contact area and the metal jacket, insofar as it is not filled up by the at least one contact element and the at least one wire end.

The manufacture of the high-temperature plug is especially simple, if the insulation compound or metal oxide is a porous material compressed with the connection sleeve by reduction of the cross-sectional area. In this case, a metal oxide powder can be charged into the connection sleeve up to the desired height and subsequently compressed, e.g., after pushing a connection sleeve onto the metal jacket, which abuts closely against same, to achieve the desired fixing and insulating action. Another possibility lies in pushing at least one molding made of insulation compound or of metal oxide onto the contact element and the wire end.

To improve the tightness of a plug embodied in this manner, e.g., against penetration of water, it is possible to provide, on the plug side on the compressed insulation compound or the compressed metal oxide, a layer of ceramic insulation compound, an epoxy resin, a high-temperature plastic, which is stable at a long-term thermal load of 180° C. or higher, or silicone rubber.

The highest temperature resistance and highest stability or best fixing of the high-temperature plug are obtained when a porous ceramic insulation compound or a metal oxide is highly compressed in the connection sleeve or when the connection sleeve is filled or cemented with ceramic insulation compound. The use of a ceramic cement compound here as the insulation compound is especially advantageous because of the simple manageability.

As contact elements for the high-temperature plug, contact pins or flat plugs offer the special advantage that in this embodiment, after separating a connection of the high-temperature plug with a counterplug without previous interruption of the operating voltage, the freely accessible male contact elements are not live. Of course, however, the use of bushings or a combination of contact pins or flat plugs and bushings is also possible. An especially suitable material for the contact elements is steel, especially spring steel because of its thermal properties and the high elasticity needed for high contact pressures.

Furthermore, it is advantageous when the contact elements in the plug-side direction project above the tube opening of the connection sleeve. Thus, it is possible to arrange still live countercontacts integrated in a housing after separating a connection of a high-temperature plug with a counterplug without previous interruption of the operating voltage. As an alternative, however, the contact elements may also be embedded in the insulation compound or the metal oxide only with the non-pluggable area and be projected from the tube opening of the connection sleeve in the plugging direction.

It is especially advantageous to provide a firm connection between the connection sleeve and the metal-jacketed end, which can especially be achieved by means of pressing, welding or soldering the connection sleeve onto the metal-jacketed end. Depending on the geometry of the application, it may, however, also be favorable to prepare such a connection by means of additional spacers, e.g., to achieve a gradual widening of the diameter.

An advantageous embodiment of the high-temperature plug provides for at least one wire end to be in electrical connection with a hot wire coiling or a heating circuit or heating layer of a heating element.

With the high-temperature plug, especially compact connections can be established when a metal-jacketed end of a heating element and an end of the jacketed thermometer in a common connection sleeve are combined into a common multipole plug or when a plurality of heat circuits in a connection sleeve are combined into a multipole plug.

For arrangements comprising a jacketed thermometer, it is advantageous if the high-temperature plug has at least two wire ends of the jacketed thermocouple, which are made of the materials of the pair of thermocouples.

The compactness of the connection is especially advantageous when the wire ends of a plurality of different heating elements or thermocouples in a single high-temperature plug are combined into a multipole plug.

Furthermore, an arrangement, in which the wire ends of a heating element and of a thermocouple integrated in the heating element open into a multipole plug, so that only a single high-temperature plug has to be used for connecting the entire arrangement, is advantageous.

For the fixation of a plug-in connection formed by using the high-temperature plug, it is favorable when the connection sleeve has at least one recess or at least one bead, which makes possible a locking with a housing of a counterplug.

In an advantageous embodiment of the high-temperature plug, the connection sleeve forms at least a part of a plug housing. In particular, the design of the high-temperature plug is especially simple if the connection sleeve forms the plug housing at the same time. As an alternative, the connection sleeve or plug housing may, however, also consist of a plurality of parts.

The heating element according to the present invention has at least one metal-jacketed connection line or at least one metal-jacketed end, in which at least one wire section which is embedded in an insulating manner within a metal jacket with a wire end led out from the metal jacket on the front side is present, and a high-temperature plug in an above-described embodiment. It is particularly especially compact and can be connected in a simple manner.

The heating element has an especially advantageous design if the metal-jacketed end is part of the unheated end of the heater or if the metal-jacketed end is a component of a jacketed thermometer.

An embodiment of the heating element that is especially advantageous with regard to insulation of the metal-jacketed end provides that the metal-jacketed end is mineral-insulated. Furthermore, it is advantageous when the wire section in the metal-jacketed end or in the metal-jacketed line is insulated by a glass fabric, a quartz fabric, a polyimide or by mica.

The thermocouple according to the present invention has at least one metal-jacketed connection line or at least one metal-jacketed end, in which at least one wire section which is embedded in an insulating manner within a metal jacket with a wire end led out from the metal jacket on the front side is present, and a high-temperature plug in an above-described embodiment. In particular, it is especially compact and can be connected in a simple manner.

An embodiment of the thermocouple that is especially advantageous with regard to insulation of the metal-jacketed end provides that the metal-jacketed end is mineral-insulated. Furthermore, it is advantageous when the wire section in the metal-jacketed end or in the metal-jacketed line is insulated by a glass fabric, a quartz fabric, a polyimide or by mica.

The temperature sensor according to the present invention has at least one metal-jacketed connection line or at least one metal-jacketed end, in which at least one wire section embedded in an insulating manner within a metal jacket with a wire end led out from the metal jacket on the front side is present, and a high-temperature plug in an above-described embodiment. In particular, it is especially compact and can be connected in a simple manner.

An especially advantageous embodiment of the temperature sensor is present if the temperature sensor is a platinum measuring resistor or an NTC.

An embodiment of the temperature sensor that is especially advantageous with regard to insulation of the metal-jacketed end provides that the metal-jacketed end is mineral-insulated. Furthermore, it is advantageous when the wire section in the metal-jacketed end or in the metal-jacketed line is insulated by a glass fabric, a quartz fabric, a polyimide or by mica.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
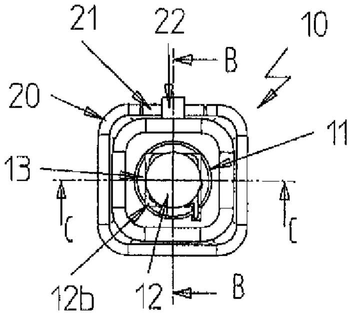
FIG. 1 is an end view of a single-pole exemplary embodiment of a high-temperature plug, viewed against the plugging direction.

Referring to the drawings in particular, in all figures identical reference numbers are used for identical components of identical exemplary embodiments.

FIG. 1 shows the view of a single-pole exemplary embodiment of a high-temperature plug 10, viewed against the plugging direction 30. Of course, it is also possible to build multipole, especially two- and four-pole plugs according to the principle of the present invention. Viewed from inside to outside, a contact element 12 with a section with square cross section 12*b*, insulation compound 13, connection sleeve 11 and an optional second connection sleeve 20, which is in the form of a square with rounded corners, on one side of which a tongue 21 with a recess 22 is integrated, are recognized. The lines B-B and C-C represent intersecting lines that illustrate the perspectives of the views of FIGS. 2 and 3, from which the design of the high-temperature plug 10 emerges more clearly.

Figure 2:
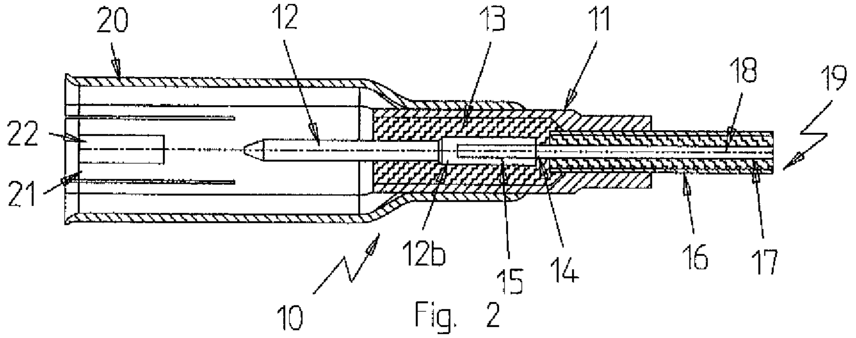
FIG. 2 is a sectional view of the exemplary embodiment from FIG. 1, cut along line C-C of FIG. 1.

FIG. 2 shows a sectional view of the exemplary embodiment from FIG. 1, cut along line C-C. A metal-jacketed connection line 19, consisting of a wire section 18, which is surrounded by an insulating embedding 17 and a metal jacket 16 at right angles to its direction of extension, is recognized. A wire end 14 projects in the plugging direction from the front surface of the metal-jacketed connection line 19.

The end section of the metal-jacketed connection line 19 is surrounded by a connection sleeve 11 made of metal, which is firmly connected to the metal jacket 16, at right angles to the direction of extension of the metal-jacketed connection line 19. The connection sleeve 11 extends out in the plugging direction over the end of the metal-jacketed connection line 19.

In a contact area 15 the wire end 14 is in contact with a contact element 12, which is designed here as a contact pin with a bore, which, however, cannot be seen in FIG. 2, because it is filled up by the plug-side end section of the wire end 14. The contact element 12 projects over the connection sleeve 11 in the plug-side direction. The area between contact element 12 or wire end 14 and the part of the connection sleeve 11 extending out in the plugging direction over the end of the metal-jacketed connection line 19 is filled up with a ceramic insulation compound 13. A filling with a metal oxide would likewise be suitable. By means of the filling, the exact positioning of the contact element 12 is fixed, on the one hand, and the thermal and electrical insulation to connection sleeve 11 is guaranteed, on the other hand. In the exemplary embodiment shown, not only is the contact area 15 embedded in the insulation compound, but also other areas of the wire end 14 and of the contact element 12, which makes the production of the high-temperature plug 10 especially simple.

To a plug-side section of the connection sleeve 11, a second sleeve 20 made of metal surrounding same in a direction at right angles to the plugging direction is fastened, which extends out in the plugging direction both over the connection sleeve 11 and over the plug-side end of the contact element 12. Even though a strong holding force is exerted between the high-temperature plug 10 and a counterplug especially when using contact elements made of steel even at high temperature, a securing of the plug-in connection by means of the second sleeve 20 is advantageous. This securing is made possible by a section of the wall of the second sleeve 20 not adjacent to the connection sleeve 11 being designed as a tongue 21, which has a recess 22. As described in more detail below based on FIGS. 4*a* and 4*b*, a locking connection between the high-temperature plug 10 and a counterplug is consequently made possible. The plug-side edge of the second sleeve 20 is advantageously bent slightly outwards, i.e., in a direction at right angles to the plugging direction to form an insertion aid for the counterplug.

Figure 3:
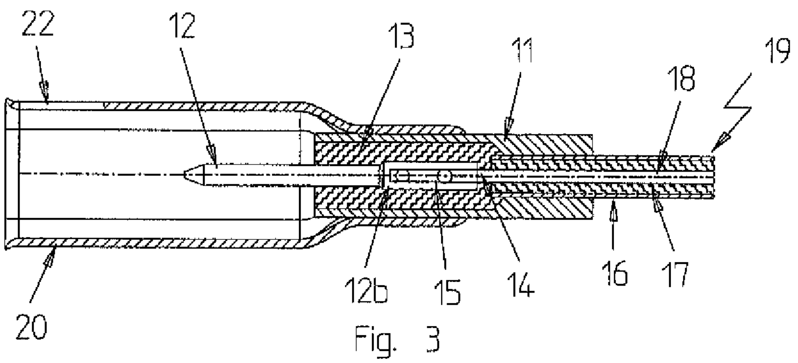
FIG. 3 is another sectional view of the exemplary embodiment from FIG. 1, cut along line B-B of FIG. 1.

FIG. 3 shows another sectional view of the exemplary embodiment from FIG. 1, cut along line B-B. The design which is disclosed in FIG. 3 corresponds in full to the design described in detail based on FIG. 2; to avoid repetitions, reference is made explicitly to the description of FIG. 2, and only additional, recognizable details are dealt with. In this section, crimp points are shown as circles in the contact area 15 to illustrate that contact element 12 and wire end 14 are fastened to one another. Furthermore, the tongue 21 cannot be seen in this section; however, it is more clear that the recess 22 breaks through the second sleeve 20.

Figure 4B:
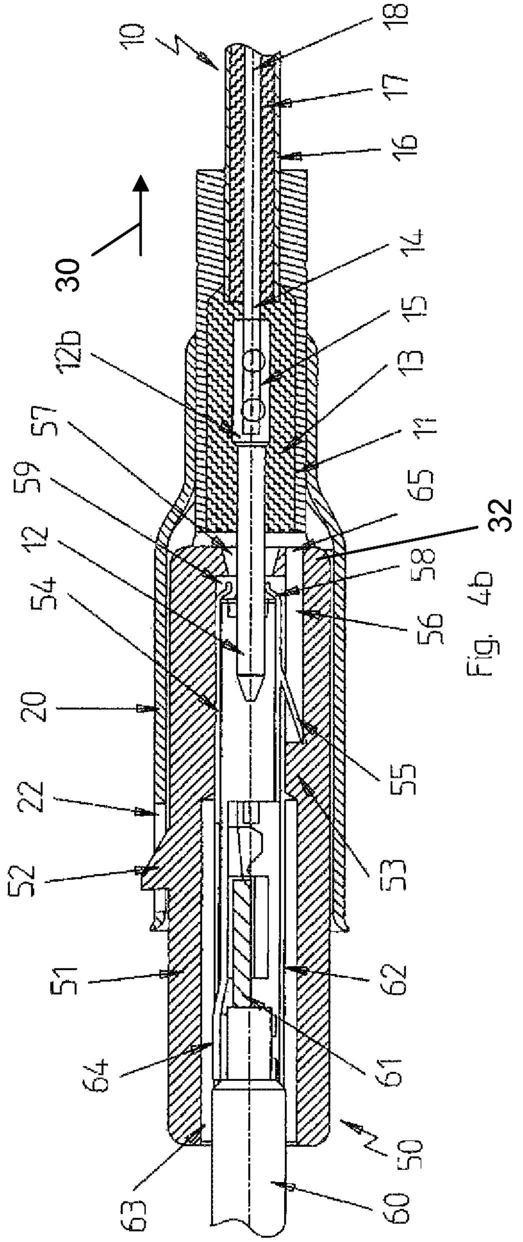
FIG. 4*b* is a sectional view showing the plug-in connection from FIG. 4*a*, viewed along line A-A of FIG. 4*a*.
Figure 4A:
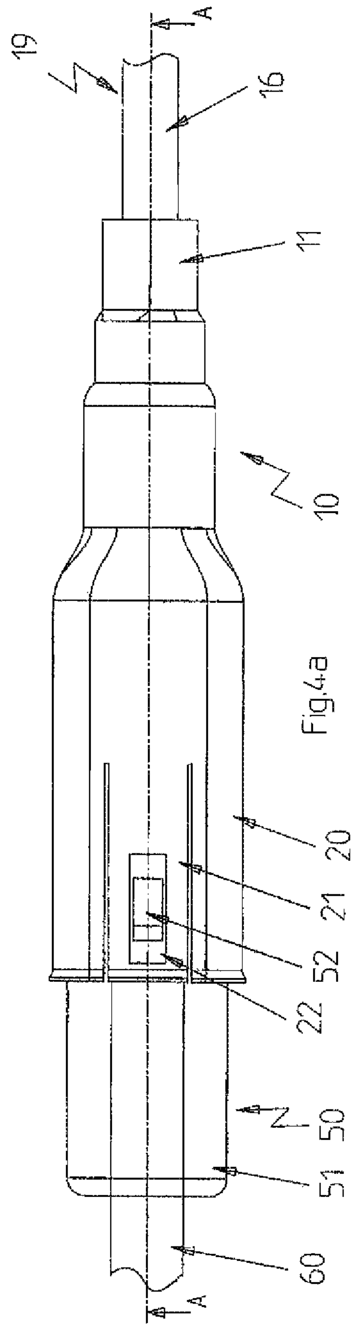
FIG. 4*a* is a side view of a plug-in connection with a counterplug produced by using the high-temperature plug shown in FIGS. 1 through 3, viewed at right angles to the plugging direction.

FIG. 4*a* shows the view of a novel plug-in connection with a counterplug 50 produced using the high-temperature plug 10 shown in FIGS. 1 through 3, viewed at right angles to the plugging direction. Of the high-temperature plug 10 only metal jacket 16 of the metal-jacketed connection line 19, connection sleeve 11 and second sleeve 20 with tongue 21 and recess 22 can be seen in this view. Of the counterplug 50, a connection line 60, a part of a housing 51 not overlapped by the second sleeve 20 and a detent 52, which is arranged at the housing 51 and which meshes with the recess 22, can be seen. Details of the design can be derived from the sectional view along the line A-A, which is shown as FIG. 4*b*.

The high-temperature plug 10, which is shown in FIG. 4*b*, is exactly identical to the high-temperature plug shown in FIG. 3; hence, for its design reference is made to the description of FIG. 3 and the description of FIG. 2 included therein. The counterplug 50 has a housing 51 with a one-piece design that is preferably made of ceramic or a high-temperature-resistant plastic. The detent 52 of the housing 51 already described in FIG. 4*a* is locked with the recess 22 in the tongue 21 of the second sleeve 20 and thus prevents an undesired detachment of the plug-in connection.

Furthermore, the housing 51 has a passage opening 57 and a duct opening 65 on the plug side 32 and an insertion opening 63 on the side opposite the plug side 32. The passage opening 57 and the insertion opening 63 are connected to one another via an interior 59 of the housing 51. The duct opening 65 is likewise connected to the interior 59 via a duct 56 that is open towards the interior 59 and runs parallel to the plugging direction. The end surface of the duct 56 formed by the wall of the housing 51, facing away from the plugging side, leads to the formation of a locking step 53. A contact element 64, which can be pushed through the insertion opening 63, which is designed here as a bushing with clamping legs 54, 58 and a mounting area 62 and is preferably made of steel and especially spring steel, is inserted into the interior 59. A stop spring 55, which is locked with the locking step 53, is arranged at clamping leg 58. The contact element 12 of high-temperature plug 10, which is designed as a contact pin, is clamped between the clamping legs 54, 58. A reliable electrical and mechanical contact between the respective contact elements 12, 64 is guaranteed by the high pressure of the clamping leg, which is made possible by the use of steel as a material for the contact elements even at high temperatures.

In the mounting area 62 of the contact element 64, electric contact is made with an exposed inner conductor 61 of a connection line 60 inserted into the housing 51 a little way through the insertion opening.

This novel combination of high-temperature plug 10 and counterplug 50 makes possible an up to now unknown, very simple and comfortable procedure in the production of the plug-in connection. After the high-temperature plug is prepared, only a piece of the inner conductor 61 on the plug-side end of the connection 60 still has to be exposed, which is then brought into electrical contact with the contact element 64 of the counterplug, e.g., by crimping or soldering. The connection line thus connected to the contact element 64 must then only be pushed through the insertion opening 63 of the housing 51 until the stop spring 55 locks with the locking step 53. Thus, contact element 64 of the counterplug 50 is fixed between locking step 53 and the plug-side wall of housing 51 and the counterplug is already mounted. To complete the plug-in connection, only the housing 51 still has to be pushed into the second sleeve 20 of the high-temperature plug 10 until the detent 52 locks into the recess 22. Then at the same time, the contact element 12 of the high-temperature plug 10 is brought into electrical connection with the contact element 64 of the counterplug 50.

The detachment of the plug-in connection is likewise simple. For this, the tongue 21 of the high-temperature plug 10 is lifted, e.g., by means of a screwdriver, so that detent 52 is released. Then high-temperature plug 10 and counterplug 50 can be pulled apart. In the same way, it is possible to push back the stop spring 55 of the contact element 64 by inserting a correspondingly shaped object through the duct opening 65 into the duct 56 and consequently make possible the pulling out of the contact element 64.

Basically, instead of the second sleeve 22, the connection sleeve 11 of the high-temperature plug 10 may be embodied, such that it projects over the contact element 12 in the plugging direction and has a tongue with a recess or a correspondingly embodied second sleeve arranged at the counterplug, which can then be brought into contact with a detent at the connection sleeve 11.

While specific embodiments of the invention have been described in detail to illustrate the application of the principles of the invention, it will be understood that the invention may be embodied otherwise without departing from such principles.

APPENDIX

List of Reference Numbers

10 High-temperature plug
11 Connection sleeve
12, 64 Contact element
12*b* Square section
13 Insulating compound
14 Wire end
15 Contact area
16 Metal jacket
17 Insulating embedding
18 Wire section
19 Metal-jacketed connection line
20 Second sleeve
21 Tongue
22 Recess
50 Counterplug
51 Housing
52 Detent
53 Locking step
54, 58 Clamping leg
55 Stop spring
56 Duct
57 Passage opening
59 Interior
60 Connection line
61 Inner conductor
62 Mounting area
63 Insertion opening
65 Duct opening

What is claimed is:

1. A high-temperature plug for a heating element and/or a thermocouple or a temperature sensor, the high-temperature plug comprising:

a metal jacket;

at least one wire section embedded in an insulating manner within a metal jacket with a wire end led out from the metal jacket on a front side, a connection sleeve made of metal, into which the at least one wire section embedded in an insulating manner within the metal jacket opens;

at least one contact element in electrical contact with the wire end led out from the metal jacket on the front side within the connection sleeve; and an insulating compound or a metal oxide, at least an end section facing the at least one wire end of the at least one contact element is embedded in the insulating compound or the metal oxide, such that the embedding fixes the contact element in the connection sleeve, said metal jacket, said at least one wire section, said connection sleeve, said at least one contact element and said insulating compound or said metal oxide forming at least a portion of a plug structure connection means for connecting to at least one of the heating element, the thermocouple and the temperature sensor.

2. A high-temperature plug in accordance with claim 1, wherein at least the end section, facing the at least one wire end, of the at least one contact element is embedded in then insulation compound or the metal oxide, such that the embedding fixes the contact element directly in the connection sleeve.

3. A high-temperature plug in accordance with claim 1, wherein the insulation compound or the metal oxide fills up a space between the at least one contact element and/or the at least one wire end and the connection sleeve.

4. A high-temperature plug in accordance with claim 3, wherein the entire volume of the connection sleeve is filled up between a contact area and said metal jacket with said insulating compound or metal oxide that is not filled up by the at least one contact element and the at least one wire end.

5. A high-temperature plug in accordance with claim 1, wherein the insulation compound or the metal oxide is a porous material compressed with the connection sleeve by reduction of cross-sectional area thereof.

6. A high-temperature plug in accordance with claim 5, wherein an epoxy resin, a high-temperature plastic with a long-term resistance of at least 180° C. or silicone rubber is applied on a plug side to the compressed insulation compound or the compressed metal oxide.

7. A high-temperature plug in accordance with claim 1, wherein the connection sleeve is filled or cemented with a ceramic insulation compound.

8. A high-temperature plug in accordance with claim 7, wherein the ceramic insulation compound is a ceramic cement compound.

9. A high-temperature plug in accordance with claim 1, wherein the contact elements project beyond a tube opening of the connection sleeve.

10. A high-temperature plug in accordance with claim 1, wherein said connection sleeve comprises a tube opening, the contact elements being only embedded in the insulation compound or the metal oxide and at least a portion of the contact elements being located at a spaced location from said tube opening.

11. A high-temperature plug in accordance with claim 1, wherein the at least one wire end is in electrical connection with a hot wire coiling or a heating circuit or a heating layer of a heating element.

12. A high-temperature plug in accordance with claim 1, wherein the at least one wire end comprises at least two wire ends of a jacketed thermocouple, which are made of the materials of the pair of thermocouples.

13. A high-temperature plug in accordance with claim 1, wherein the at least one wire end comprises the wire ends of a plurality of different heating elements or thermocouples in one plug are combined into said plug structure.

14. A high-temperature plug in accordance with the claim 1, wherein the at least one wire end comprises the wire ends of a heating element and of a thermocouple integrated in the heating element open into said plug structure.

15. A thermocouple or temperature sensor comprising:

a metal jacket;

a connection line with at least one wire section embedded in an insulating manner within said metal jacket to form a metal jacketed connection line or at least one metal jacketed end with a wire end led out from the metal jacket on a front side;

a connection sleeve made of metal, into which the at least one wire section embedded in an insulating manner within the metal jacket opens;

at least one contact element in electrical contact with the wire end led out from the metal jacket on the front side within the connection sleeve; and an insulating compound or a metal oxide, at least an end section facing the at least one wire end of the at least one contact element is embedded in the insulating compound or the metal oxide, such that the embedding fixes the contact element in the connection sleeve, said metal jacket, said at least one wire section, said connection sleeve, said at least one contact element and said insulating compound or said metal oxide forming at least a portion of a plug structure, said plug structure comprising a connection to one of a heating element, the thermocouple and the temperature sensor.

16. A thermocouple or temperature sensor in accordance with claim 15, wherein:

at least the end section, facing the at least one wire end, of the at least one contact element is embedded in then insulation compound or the metal oxide, such that the embedding fixes the contact element directly in the connection sleeve;

the insulation compound or the metal oxide fills up a space between the at least one contact element and/or the at least one wire end and the connection sleeve; and the entire volume of the connection sleeve is filled up between a contact area and said metal jacket with ceramic insulation compound or metal oxide that is not filled up by the at least one contact element and the at least one wire end.

17. A thermocouple or temperature sensor in accordance with claim 15, wherein:

the insulation compound or the metal oxide is a porous material compressed with the connection sleeve by reduction of cross-sectional area thereof; and a layer of ceramic insulation compound, an epoxy resin, a high-temperature plastic with a long-term resistance of at least 180° C. or silicone rubber is applied to the compressed insulation compound or the compressed metal oxide.

* * * * *